(12) United States Patent
Schlesener et al.

(10) Patent No.: US 7,715,366 B1
(45) Date of Patent: *May 11, 2010

(54) USER BASED MESSAGE PRIORITIZATION

(75) Inventors: Matthew C. Schlesener, Olathe, KS (US); Pallavur A. Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1763 days.

This patent is subject to a terminal disclaimer.

(21) Appl. No.: 10/844,682

(22) Filed: May 13, 2004

(51) Int. Cl.
*H04L 12/66* (2006.01)
*H04L 12/28* (2006.01)
(52) U.S. Cl. .................... 370/352; 370/401
(58) Field of Classification Search ......... 370/352–356, 370/401
See application file for complete search history.

(56) References Cited

U.S. PATENT DOCUMENTS

| | | | | |
|---|---|---|---|---|
| 6,363,065 | B1 * | 3/2002 | Thornton et al. | 370/352 |
| 6,871,217 | B2 * | 3/2005 | Voticky et al. | 709/207 |
| 7,424,006 | B1 * | 9/2008 | Schlesener et al. | 370/352 |
| 7,624,175 | B1 * | 11/2009 | Schlesener et al. | 709/224 |
| 2004/0157619 | A1 * | 8/2004 | Corson et al. | 455/456.1 |
| 2004/0176100 | A1 * | 9/2004 | Florkey et al. | 455/456.1 |
| 2005/0068936 | A1 * | 3/2005 | Keskiniva et al. | 370/352 |

OTHER PUBLICATIONS

Schlesener, Matthew C., Performance Evaluation of Telephony Routing over IP (TRIP), B.S.E.E. Kansas State University, Fall 1996, submitted to the Department of Electrical Engineering and Computer Science and the Faculty of the Graduate School of the University of Kansas in partial fulfillment of the requirements for the degree of Master's of Science.

* cited by examiner

*Primary Examiner*—Fan Tsang
*Assistant Examiner*—Mohammad K Islam

(57) ABSTRACT

A communication system including a call control system, a plurality of network nodes, and a gateway coupled to the call control system and coupled to the plurality of network nodes. The gateway is configured to interwork communications between the plurality of network nodes and, responsive to a first status change associated with a first network node of the plurality of network nodes, transfers a first update message to the call control system wherein the first update message indicates the gateway, the first status change, and the first network node. The call control system, responsive to receiving the first update message, processes the first update message to determine a first user associated with the first network node and to determine a first priority for the first update message based on the first user associated with the first network node.

31 Claims, 5 Drawing Sheets

USER BASED MESSAGE PRIORITIZATION

RELATED APPLICATIONS

Not Applicable

FEDERALLY SPONSORED RESEARCH OR DEVELOPMENT

Not Applicable

MICROFICHE APPENDIX

Not Applicable

BACKGROUND OF THE INVENTION

1. Field of the Invention

The invention is related to packet network technologies, and in particular, to methods and systems for user based prioritized message processing.

2. Description of the Prior Art

Packet based voice communication networks package and transmit voice communications based on packet protocols. Voice over Internet Protocol (VoIP) networks typify modern packet based voice communication networks. VoIP networks digitize, compress, and convert voice communications to interne protocol (IP) packets. Specialized signaling protocols are then employed to setup and tear down VoIP calls. Specialized signaling is also utilized to locate users across the various VoIP networks. Session Initiation Protocol (SIP) is an example of a well known VoIP signaling protocol.

SIP provides advanced signaling and control to VoIP networks for initiating, managing, and terminating VoIP network sessions, or calls. A typical SIP enabled VoIP network includes user agents, proxy servers, and media gateways. User agents are the end users of a SIP network. User agents can be the origin or destination for a call over a VoIP network. Media gateways interwork communications for calls between VoIP networks and for calls that either originate or terminate outside of a VoIP network. Proxy servers provide registration, redirect, and location services implemented by registrar, redirect, and location server applications running on the proxy servers. In particular, registrar servers manage user agents assigned to their network domains. Redirect servers redirect SIP messages to their appropriate destinations and return location information in response to queries. Location servers share responsibility for knowing the location and status of each gateway.

Telephony Routing over Internet Protocol (TRIP) is a well known protocol established to effectuate messaging between location servers and gateways to keep track of the location and status of the gateways. TRIP does not run directly over IP—it must ride over a telephony protocol like SIP or H.323 because IP does not provide the infrastructure (e.g. SIP proxy server and media gateway) nor the packet structure to provide what TRIP needs to do its very specific job (dynamic building of proxy server routing tables). In a SIP only network, location servers are not utilized; rather, the proxy server uses standard Domain Name Service (DNS) methods to determine where to forward call requests. In a TRIP enabled SIP network, the location server builds a dynamic routing table based on TRIP update messages transmitted from various media gateways and location servers. The location server then accesses the resulting TRIP routing table to determine where to forward and redirect call requests.

TRIP enabled location servers are often referred to as TRIP speakers. A scaled down version of TRIP called TRIP-lite can be implemented on gateways. TRIP-lite transmits messaging from a gateway to at least one location server advertising the available routes and prefixes accessible through that gateway. For example, a first TRIP-lite enabled gateway might advertise to a location server that it services the 913 area code of the public switched telephone network (PSTN), while a second TRIP-lite enabled gateway advertises to the location server that it services the 816 area code of the PSTN. Thus, when a call request indicating a PSTN area code of 913 arrives into the location server, the location server knows to route that call to the first TRIP-lite enabled gateway. Other attributes advertised by TRIP-lite enabled gateways include destination prefixes, capacity to each prefix destination, and utilization levels of each trunk group terminating at the gateway. TRIP-lite allows location servers to have real-time knowledge of available gateway resources.

One problem with current VoIP network configurations is the inability of the networks to deliver consistently high levels of quality of service (QoS) on a per user basis. For example, when a SIP enabled location server receives multiple update messages from several TRIP-lite enabled gateways, the volume of messages could push the location server into a period of congestion. Currently, the location server has no way to prioritize the messages to ensure a basic QoS level across the network. Additionally, the location server has no way by which to ensure a QoS level for specific VoIP users of the network. Thus, the location server treats each update message as if each update message is as important as any other. However, the content of some of the update messages are typically more important than the content of others. Furthermore, some users accessing the network may be more important than other users accessing the network. Therefore, it would be useful and desirable to provide varying levels of QoS for various users when processing update messages to build network routing tables.

SUMMARY OF THE INVENTION

An embodiment of the invention solves the above problems and other problems by providing systems, methods, and software that prioritize update messages from gateways based on users associated with the gateways. A communication system in an embodiment of the invention includes a call control system, a plurality of network nodes, and a gateway coupled to the call control system and coupled to the plurality of network nodes. The gateway is configured to interwork communications between the plurality of network nodes and, responsive to a first status change associated with a first network node of the plurality of network nodes, transfers a first update message to the call control system wherein the first update message indicates the gateway, the first status change, and the first network node. The call control system, responsive to receiving the first update message, processes the first update message to determine a first user associated with the first network node and to determine a first priority for the first update message based on the first user associated with the first network node.

In another embodiment of the invention, the gateway, responsive to a second status change associated with a second network node of the plurality of network nodes, transfers a second update message to the call control system wherein the second update message indicates the gateway, the second status change, and the second network node, and the call control system, responsive to receiving the second update message, processes the second update message to determine a second user associated with the second network node and determine a second priority for the second update message based on the second user associated with the second network node.

In another embodiment of the invention, the call control system processes the first update message to determine a first quality of service level for the first user and determines the first priority for the first update message based on the first quality of service level for the first user.

In another embodiment of the invention, the call control system processes the second update message to determine a second quality of service level for the second user and determine the second priority for the second update message based on the second quality of service level for the second user.

In another embodiment of the invention, the call control system, in response to entering a period of congestion, drops either the first update message or the second update message in an order according to the first and second priorities determined for the first and second update messages.

In another embodiment of the invention, the call control system processes the first and second update messages to update a routing table in an order according to the first and second priorities determined for the first and second update messages.

In some embodiments of the invention, the routing table comprises a telephony routing over internet protocol (TRIP) routing table.

In some embodiments of the invention, the first network node comprises a wireless base station.

In some embodiments of the invention, the gateway comprises a telephony routing over internet protocol-lite (TRIP-lite) enabled gateway.

In some embodiments of the invention, the call control system comprises a telephony routing over internet protocol (TRIP) enabled location server.

Advantageously, an embodiment of the invention determines the priority of update messages based on the various users associated with various gateways. Such a method provides an efficient mechanism for clearing periods of congestion. Additionally, determining a priority based on a user results in a system by which important network customers receive service commensurate with their importance. For example, an enterprise such as a large corporation may negotiate with the service provider of a VoIP network for a certain level of service for certain users. Rather than provide the same high level of service to all employees of the corporation, the service provider can provide a high level of service to some employees, and a lower level of service to other employees.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-3

Figure 1:
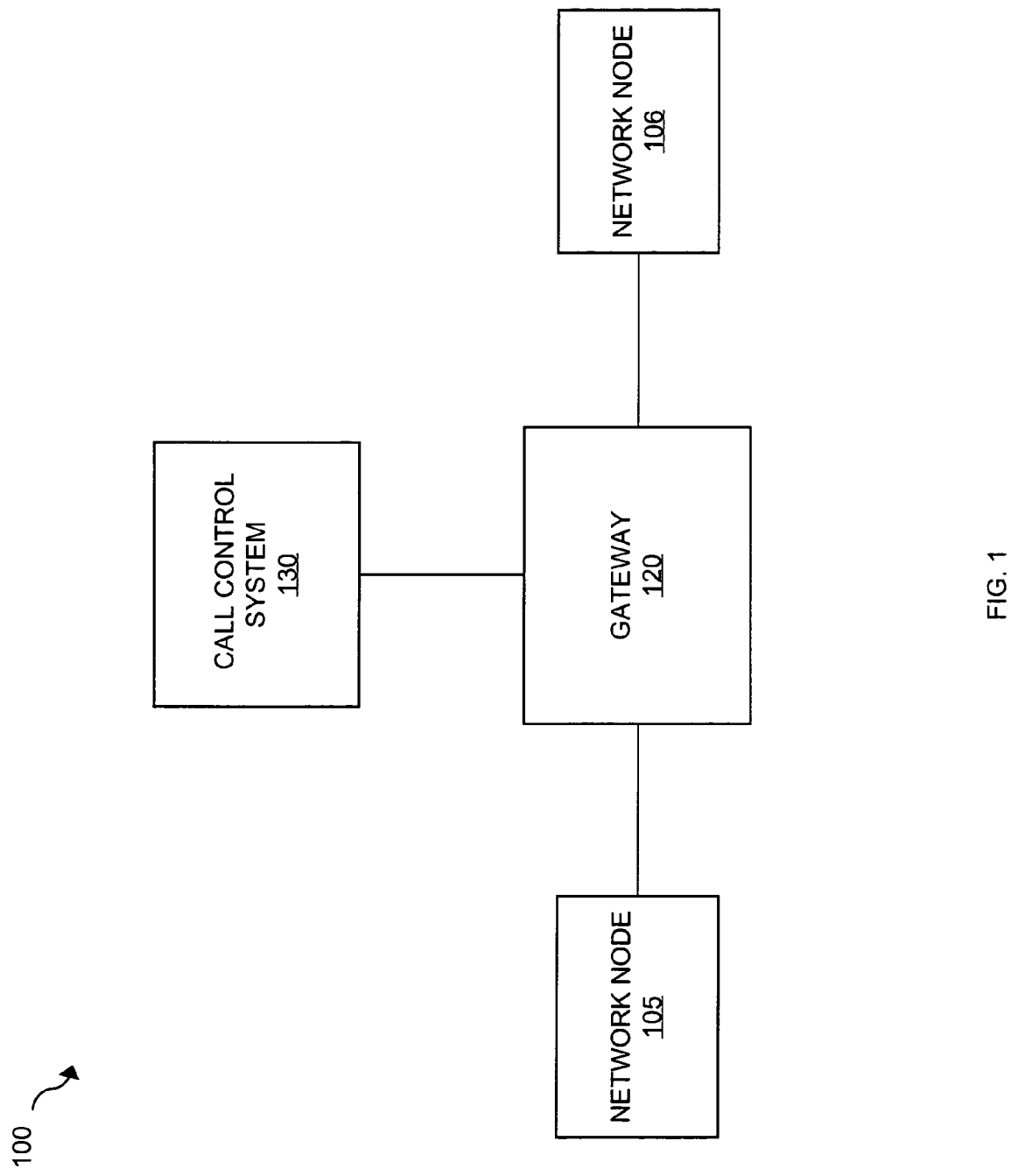
FIG. 1 illustrates a communication system in an embodiment of the invention.

FIG. 1 illustrates communication system 100 in an embodiment of the invention. Communication system 100 includes call control system 130, gateway 120, and network nodes 105, 106. Gateway 120 is coupled to call control system 110 and network nodes 105, 106.

Gateway 120 is any gateway capable of interworking communications between network nodes 105, 106. Gateway 120 is also any gateway, responsive to status changes of network nodes 105, 106 capable of transferring update messages to call control system 130. Each update message could indicate the gateway, a network node undergoing a status change, and the status change. An example of a status change includes the network node going offline, reducing capacity, increasing capacity, coming online, or other changes of status.

Call control system 130 is any call control system capable of receiving update messages from gateway 120. Additionally, call control system 130 is any call control system capable of processing the update messages to determine a priority associated with each update message by determining users associated with network nodes 105, 106 indicated in the update messages. Call control system 130 is also any call control system capable of processing the update messages to determine quality of service (QoS) levels for the users associated with network nodes 105, 106 and to determine the priorities based on the QoS levels for the users.

Network nodes 105, 106 are any network nodes capable of transferring and receiving communications to and from gateway 120. Network nodes 105, 106 could be, for example, sectors of the public switched telephone network (PSTN). For instance, each one of network nodes 105, 106 could be a particular area code of the PSTN. Each one of network nodes 105, 106 could also be nodes of a packet communications network. Network nodes 105, 106 could also be cells of a wireless network. For example, each node could represent a wireless base station that services a cell of a wireless network. A user uses a communication device, such as a wireless phone, to access communication network 100 through one of network nodes 105, 106.

Figure 2:
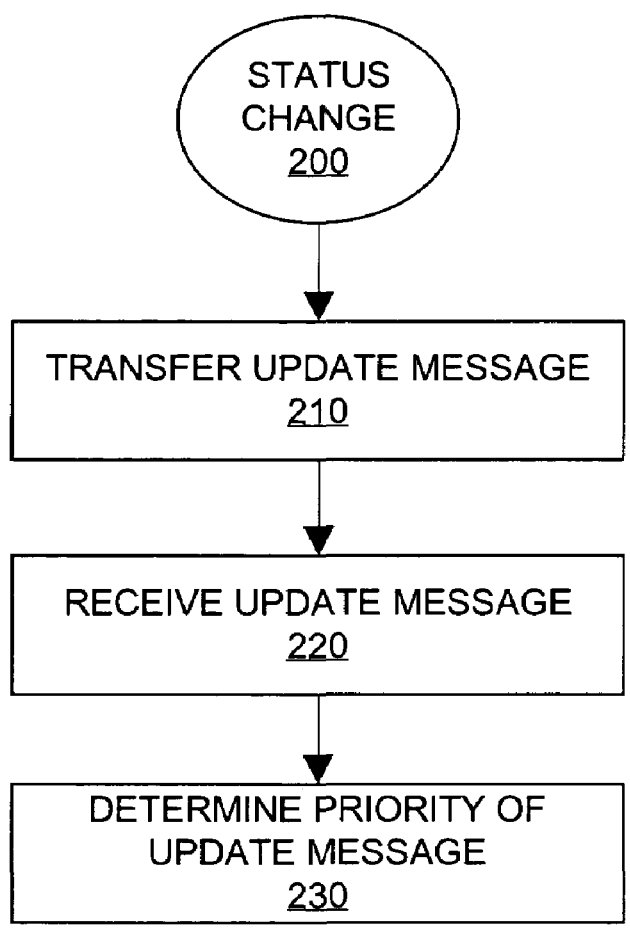
FIG. 2 illustrates the operation of a communication system in an embodiment of the invention.

FIG. 2 illustrates the operation of communication system 100 in an embodiment of the invention. To begin, a status change occurs with respect to network node 105. For example, gateway 120 typically interworks communications to and from network node 105. Gateway 120 could go offline with respect to network node 105. Alternatively, gateway 120 could come online with respect to network node 105. In response gateway 120 transfers an update message to call control system 130 (Step 210).

Next, call control system 130 receives the update message. The update message indicates gateway 120, network node 105, and the status change associated with network node 105. Call control system 130 processes the update message to determine a user associated with network node 105. For example, call control system 130 identifies a particular user accessing communication network 100 using a cell phone in communication with network node 105. In this example, network node 105 could be a wireless base station transceiver. Call control system then determines a priority associated with the update message based on the particular user (Step 230). For example, the user could have rights to a high quality of service level relative to a normal group of users. Call control system 130 should then assign a high priority to the update message.

Figure 3:
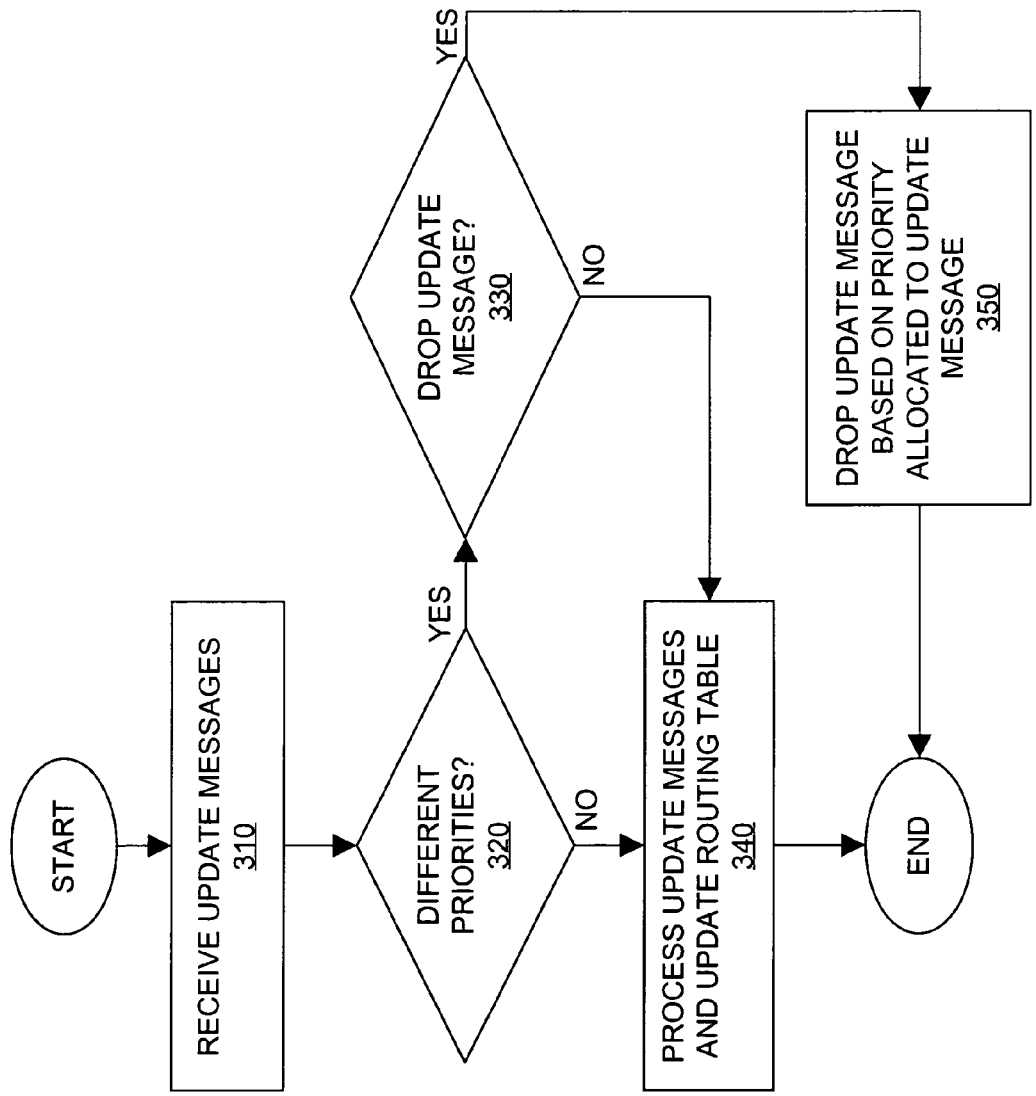
FIG. 3 illustrates the operation of a communication system in an embodiment of the invention.

FIG. 3 further illustrates the operation of communication system 100 in an embodiment of the invention. A status change could occur with respect to network node 106. In such a case, gateway 120 transfers another update message to call control system 130. Call control system 130 receives the update message which indicates the status change associated with network node 106 and processes the update message to determine a user associated with network node 106. Call control system 130 then determines a priority associated with the update message based on the user associated with network node 106.

Upon receiving both update messages (Step 310) and determining priorities for both update messages, call control system 130 determines if the priorities for each update message differ (Step 320). If the priorities are the same, then call control system 130 processes the update messages to update a routing table (Step 340) in the order that the update messages were received. The routing table holds data related to routes for routing communications. Call control system 130 updates the routing table by indicating the status change for any routes associated with gateway 120 and network nodes 105, 106.

If the priorities assigned to the update messages differ, call control system 130 determines whether or not an update message should be dropped (Step 330). For example, if call control system 130 is in a period of message congestion, dropping some messages lessens the congestion. If a message should be dropped, call control system 130 drops one of the update messages based on their order of priority (Step 350). If messages need not be dropped, then call control system 130 processes the update messages in the order they were received to update the routing table (Step 340).

Second Embodiment Configuration and Operation

FIG. 4

Figure 4:
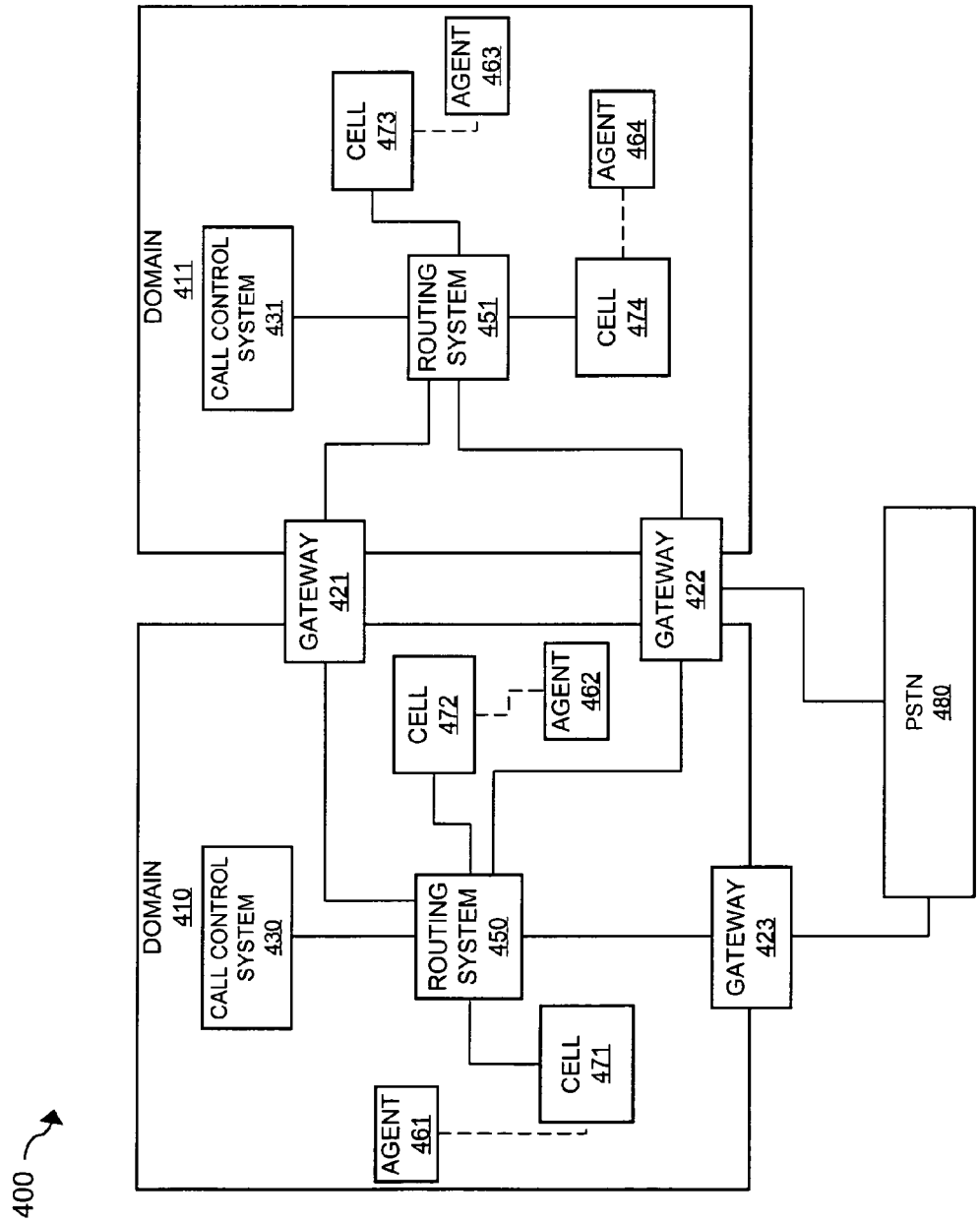
FIG. 4 illustrates a communication system in an embodiment of the invention.

FIG. 4 illustrates communication network 400 in an embodiment of the invention. Communication network 400 includes domain 410, domain 411, and PSTN 480. Domain 410 is coupled to domain 411 by gateway 421 and gateway 422. Domain 410 is coupled to PSTN 480 by gateways 423, 422. Domain 411 is also coupled to PSTN 480 by gateway 422. Domain 410 also includes call control system 430, cell 417, cell 472, routing system 450, agent 461, and agent 462. Domain 411 also includes call control system 431, cell 473, cell 474, agent 463, agent 464, and routing system 451.

In this embodiment, domain 410 represents any logical network such as a VoIP network, local area network (LAN), wide area network (WAN), metropolitan area network (MAN), or other similar network aggregations. Similarly, domain 411 represents any logical network such as a VoIP network, LAN, WAN, or MAN. For example, domains 410 and 411 could be enterprise networks. In another example, domains 410 and 411 could be campus networks.

Cells 471, 472 are communication cells of domain 410. For example, cells 471, 472 could be wireless base stations in communication with wireless devices. Cells 471, 472 would then transfer communications for the wireless devices to and from routing system 450. Routing system 450 would then route the communications to their appropriate destinations according to routing instructions for the communications. Agents 461, 462 could be wireless devices in communication with cells 471, 472.

Gateway 421 is any gateway capable of interworking communications between domain 410 and domain 411. Gateway 421 is also any gateway capable of transferring update messages to call control systems 430, 431. Similarly, gateway 422 is any gateway capable of interworking communications between domain 410 and domain 411 and transferring update messages to call control systems 430, 431. Gateway 423 is any gateway capable of interworking communications between domain 410 and PSTN 480. Gateway 423 is also any gateway capable of transferring update messages to call control system 430. Gateways 421, 422, 423 are commonly referred to in the art as a media gateways.

Call control system 423 is any call control system capable of receiving and processing update messages from gateways 421, 422, 423. Call control system 423 is also any call control system capable of receiving and processing session request messages from agents 461, 462. Additionally, call control system 430 is any call control system capable of determining a priority for the update messages and updating a routing table based on the update messages. Call control system 431 is any call control system capable of receiving and processing update message from gateways 421, 422. Additionally, call control system 431 is any call control system capable of determining a priority for the update messages and updating a routing table based on the update messages. Call control system 431 is also any call control system capable of receiving and processing session request messages from agents 463, 464. Call control systems 430, 431 are commonly referred to by those skilled in the art as media gateway controllers or as soft switches.

In this embodiment of the invention, call control systems 430, 431 are proxy servers each running an instance of a location server application. The location servers running on call control systems 430 and 431 are SIP and TRIP enabled. TRIP enabled location servers are commonly referred to in the art as TRIP speakers. Similarly, gateways 421, 422, 423 are TRIP-lite enabled gateways. Thus, the messaging that occurs between gateways 421, 422, 423, and call control systems 430, 431 occurs in accordance with TRIP. The routing tables updated by call control systems 430, 431 are TRIP routing tables.

Agents 461, 462, 463, 464 are SIP enabled wireless phones and could be referred to as a SIP client, or a soft SIP client. A SIP phone is assigned an identifier (e.g. SIPuser@domain.com) and can receive incoming calls and place outgoing calls. In a basic SIP network, the proxy server can forward an incoming call request to the next proxy server along the path to the called phone. It also can provide information back to a caller to provide destination information so that the caller can reach the destination SIP phone directly. Cells 471, 472, 474, 474 therefore provide network nodes for agents 461, 462, 463, 464.

Gateway 423 also serves as a signaling conversion point for signaling from PSTN 480. Gateway 423 serves a particular node of PSTN 480. For example, gateway 423 converts communications from a switch in PSTN 480 to a protocol for domain 410, such as VoIP. Gateway 423 serves particular nodes or area codes of PSTN 480. As known to those skilled in the art, PSTN 480 utilizes the SS7 signaling protocol. Gateway 423 is capable of interworking SS7 signaling to a protocol appropriate for domain 410. Similarly, gateway 422 also serves a particular node of PSTN 480 and converts signaling and communications to and from formats compatible with domains 410, 411.

The following describes the operation of communication network 400 in an embodiment of the invention. As discussed above, call control systems 430, 431 are responsible for monitoring the status of various gateways within domains 410, 411. Specifically, call control system 430 keeps track of the status of gateways 421, 422 and 423. Call control system 431 monitors the status of gateways 421, 422, and 423. Call control systems 430, 431 exchange SIP update messages to update each other on the status of other gateways to which they are not directly connected.

When a user desires to place a call using agent 461, agent 461 transmits a SIP session request to call control system 430. Call control system 430 is able to determine the best route for the call based on several factors such as available routes, distance, and cost. The SIP session request indicates the identity of the user and the domain of the user in the format of SIPuser@domain.com. Call control system 430 knows from the SIP session request whether or not the user is part of domain 410. For example, domain 430 could be a campus of a corporate enterprise and the user could be an employee of the corporate enterprise.

Cells 471 and 472 are wireless base stations situated throughout the campus. Thus, when a user uses a SIP agent to initiate a SIP VoIP session, call control system 430 stores the identity of the user in association with the cell utilized by the user. Furthermore, a SIP session request typically indicates a destination for the SIP session. Call control system 430 therefore stores not only the identity of the user and the cell, but also the specific gateway utilized to connect the user with the destination. The gateway can be stored in association with the user in a modified TRIP routing table.

However, while callers commence SIP sessions, many other calls and operations are occurring nearly simultaneously within and across domains 410, 411. The level of activity within and across domains 410, 411 impacts how quickly, efficiently, and accurately call control systems 430, 431 are able to process call requests, call forwarding requests, update messages, and all other types of messaging and activity.

Call control systems 430, 431 therefore employ SIP and TRIP for call control. For instance, call control system 430 runs an instance of a SIP and TRIP enabled location server for managing the operational aspects of gateways 421, 422, and 423. When. SIP agent 461 initiates the call to SIP agent 463, SIP agent 461 alerts call control system 430 of the requested call by way of a SIP session request. Call control system 430 accesses a TRIP routing table to determine the appropriate outgoing gateway for the call. Upon determining that gateway 421 is the appropriate gateway for the call, call control system stores the identity of the user of agent 461 in association with gateway 421. In this example, the user of agent 461 is a high level employee of the corporate enterprise.

Another user utilizing SIP agent 462 initiates a call to SIP agent 464. A SIP session request is transmitted from agent 462 to call control system. Call control system determines that gateway 422 is the appropriate gateway for the call from agent 462 to agent 464. In this example, the user utilizing agent 462 is a low level employee of the corporate enterprise.

Call control system 430 also continually receives update messages from various gateways indicating status changes of the gateways. For example, call control system 430 receives an update message from gateway 422 indicating that the switch in PSTN 480 which gateway 422 services has gone offline. Call control system 430 also receives an update message from gateway 423 indicating that a switch in PSTN 480 services by gateway 423 has come online. Call control system 430 also receives an update message from gateway 421 indicating that gateway 421 has increased bandwidth for interworking communications to domain 411.

In response to receiving the update messages, call control system 430 processes the update messages to determine particular users associated with the gateways. In this example, call control system 430 determines that the user utilizing agent 461 is associated with gateway 421 and that the user utilizing agent 462 is associated with gateway 422. Call control system 430 also determines that the user utilizing agent 461 is a high level employee of the corporate enterprise and that the user utilizing agent 462 is a low level employee of the corporate enterprise. No users are associated with gateway 423. Based on the employment level within the corporate enterprise, call control system 430 determines that the user of agent 461 should receive a higher quality of service level than the user of agent 462. Thus, call control system 430 assigns a high priority to the update message from gateway 421, and a low priority to the update message from gateway 422.

While FIG. 4 illustrates call control system 430 as coupled to only three gateways, call control system 430 could be coupled to many more gateways. In such a case, the volume and frequency of update messages received by call control system 430 could reach a level as to cause congestion within call control system 430. At such a time, call control system 430 must decide which update messages to drop and which to retain in order to clear the congestion caused by the high level of update message traffic. By prioritizing update messages based on the user associated with the gateways, call control system 430 is able to clear congestion without discarding some update messages that are more important than others.

A period of congestion could be caused, for example, by the situation wherein call control system 430 receives three update messages from gateways 421, 422, and 423. If call control system 430 is not in a period of congestion, the update messages are processed in the respective order they were received, and call control system 430 updates a TRIP routing table based on the content of the messages. However, if call control system 430 is in a period of congestion, some of the messages must be dropped to relieve the congestion. Call control system 430 therefore drops the update message from gateway 423. Next, call control system 430 drops the update message from gateway 422. Lastly, if required, call control system 430 drops the update message from gateway 421. Update messages from gateway 421 receive a higher quality of service level than update messages from other gateways. The high level employee using agent 461 also receives a higher quality of service level than the low level employee using agent 462 because the gateway servicing the high level employee's call receives processing preference.

Call control system 430 determines the priority of update messages based on the various users associated with various gateways. Such a method provides an efficient mechanism for clearing periods of congestion. Additionally, determining a priority based on a user results in a system by which important network customers receive service commensurate with their importance. For example, an enterprise such as a large corporation may negotiate with the service provider of a VoIP network for a certain level of service for certain users. Rather than provide the same high level of service to all employees of the corporation, the service provider can provide a high level of service to some employees, and a lower level of service to other employees.

Computer System

FIG. 5

Figure 5:
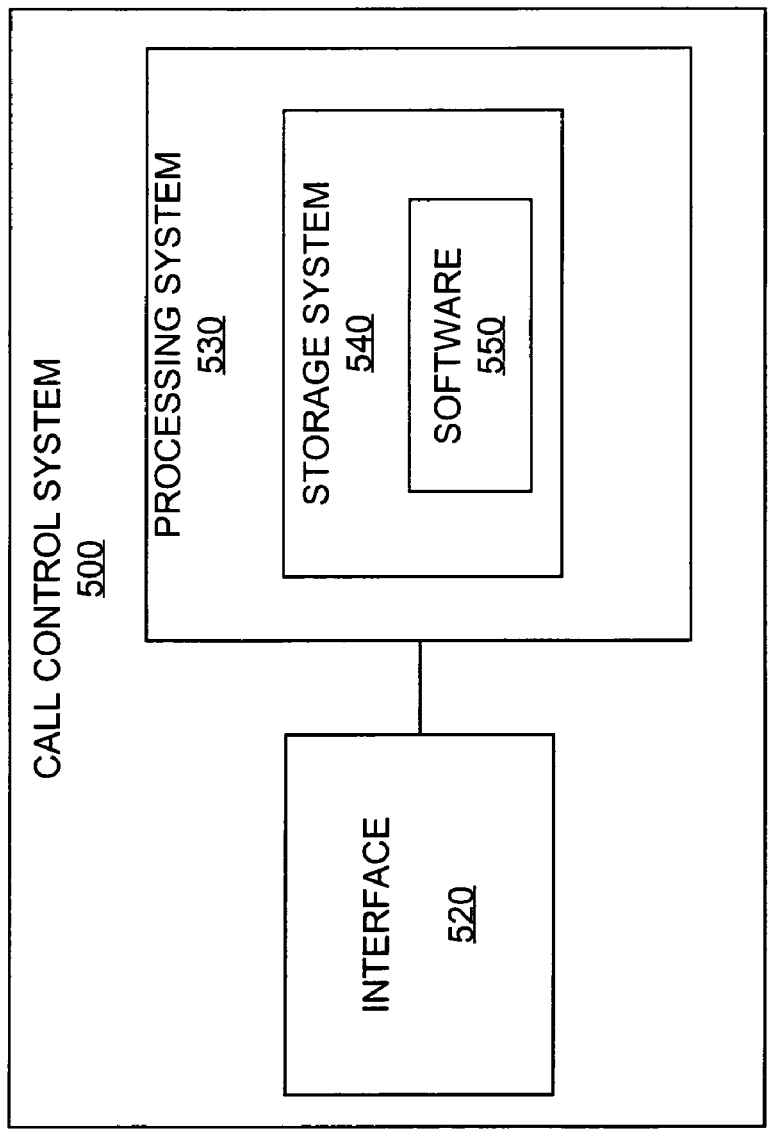
FIG. 5 illustrates a computer system in an embodiment of the invention.

FIG. 5 illustrates computer system 500 in an embodiment of the invention. Computer system 500 includes interface 520, processing system 530, storage system 540, and software 550. Storage system 540 stores software 550. Processing system 530 is linked to interface 520. Computer system 500 could be comprised of a programmed general-purpose computer, although those skilled in the art will appreciate that programmable or special purpose circuitry and equipment may be used. Computer system 500 may use a client server architecture where operations are distributed among a server system and client devices that together comprise elements 520-550.

Interface 520 could comprise a network interface card, modem, port, or some other communication device. Signaling interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for call control systems 130, 430, and 431.

What is claimed is:

1. A communication system comprising:
   a call control system;
   a plurality of network nodes; and
   a gateway coupled to the call control system and coupled to the plurality of network nodes and configured to interwork communications between the plurality of network nodes;
   the gateway, responsive to a first status change associated with a first network node of the plurality of network nodes, transfers a first update message to the call control system wherein the first update message indicates the gateway, the first status change, and the first network node;
   the call control system, responsive to receiving the first update message, processes the first update message to determine an identity of a first user associated with the first network node and to determine a first priority for the first update message based on the identity of the first user associated with the first network node.

2. The communication system of claim 1 wherein the gateway, responsive to a second status change associated with a second network node of the plurality of network nodes, transfers a second update message to the call control system wherein the second update message indicates the gateway, the second status change, and the second network node, and the call control system, responsive to receiving the second update message, processes the second update message to determine an identity of a second user associated with the second network node and determine a second priority for the second update message based on the identity of the second user associated with the second network node.

3. The communication system of claim 1 wherein the call control system processes the first update message to determine a first quality of service level for the first user and determines the first priority for the first update message based on the first quality of service level for the first user.

4. The communication system of claim 2 wherein the call control system processes the second update message to determine a second quality of service level for the second user and determine the second priority for the second update message based on the second quality of service level for the second user.

5. The communication system of claim 2 wherein the call control system, in response to entering a period of congestion, drops either the first update message or the second update message in an order according to the first and second priorities determined for the first and second update messages.

6. The communication system of claim 2 wherein the call control system processes the first and second update messages to update a routing table in an order according to the first and second priorities determined for the first and second update messages.

7. The communication system of claim 6 wherein the routing table comprises a telephony routing over internet protocol (TRIP) routing table.

8. The communication system of claim 1 wherein the first network node comprises a wireless base station.

9. The communication system of claim 1 wherein the gateway comprises a telephony routing over internet protocol-lite (TRIP-lite) enabled gateway.

10. The communication system of claim 1 wherein the call control system comprises a telephony routing over internet protocol (TRIP) enabled location server.

11. A method of operating a communication system comprising a call control system, a plurality of network nodes, and a gateway coupled to the call control system and coupled to the plurality of network nodes and configured to interwork communications between the plurality of network nodes, the method comprising:
    transferring a first update message from the gateway to the call control system responsive to a first status change associated with a first network node of the plurality of network nodes wherein the first update message indicates the gateway, the first status change, and the first network node;
    receiving the first update message from the gateway;
    processing the first update message to determine an identity of a first user associated with the first network node; and
    determining a first priority for the first update message based on the identity of the first user associated with the first network node.

12. The method of claim 11 further comprising:
    transferring a second update message from the gateway to the call control system responsive to a second status change associated with a second network node of the plurality of network nodes wherein the second update message indicates the gateway, the second status change, and the second network node, and the call control system;
    receiving the second update message from the gateway;

processing the second update message to determine an identity of a second user associated with the second network node; and determining a second priority for the second update message based on the identity of the second user associated with the second network node.

13. The method of claim 11 further comprising processing the first update message to determine a first quality of service level for the first user wherein determining the first priority for the first update message based on the first user associated with the first network node comprises determining the first priority based on the first quality of service level for the first user.

14. The method of claim 12 further comprising processing the second update message to determine a second quality of service level for the second user and wherein determining the second priority for the second update message based on the second user associated with the second network node comprises determining the second priority based on the second quality of service level for the second user.

15. The method of claim 12 further comprising dropping either the first update message or the second update message in an order according to the first and second priorities determined for the first and second update messages in response to the call control system entering a period of congestion.

16. The method of claim 12 further comprising processing the first and second update messages to update a routing table in an order according to the first and second priorities determined for the first and second update messages.

17. The method of claim 16 wherein the routing table comprises a telephony routing over internet protocol (TRIP) routing table.

18. The method of claim 11 wherein the first network node comprises a wireless base station.

19. The method of claim 11 wherein the gateway comprises a telephony routing over internet protocol-lite (TRIP-lite) enabled gateway.

20. The method of claim 11 wherein the call control system comprises a telephony routing over internet protocol (TRIP) enabled location server.

21. A call control system comprising:
an interface configured to receive a first update message wherein a gateway coupled to a plurality of network nodes and configured to interwork communications between the plurality of network nodes transfers the first update message responsive to a first status change associated with a first network node of the plurality of network nodes wherein the first update message indicates the gateway, the first status change, and the first network node; and
a processing system coupled to the interface and configured to process the first update message to determine an identity of a first user associated with the first network node and to determine a first priority for the first update message based on the identity of the first user associated with the first network node.

22. The call control system of claim 21 wherein the interface is further configured to receive a second update message wherein the second update message indicates the gateway, a second status change associated with a second network node of the plurality of network nodes, and the second network node, and wherein the processing system is further configured to process the second update message to determine an identity of a second user associated with the second network node and determine a second priority for the second update message based on the identity of the second user associated with the second network node.

23. The call control of claim 21 wherein the processing system is configured to process the first update message to determine a first quality of service level for the first user and to determine the first priority for the first update message based on the first quality of service level for the first user.

24. The call control system of claim 22 wherein the processing system is configured to process the second update message to determine a second quality of service level for the second user and determine the second priority for the second update message based on the second quality of service level for the second user.

25. The call control system of claim 22 wherein the processing system, in response to entering a period of congestion, drops either the first update message or the second update message in an order according to the first and second priorities determined for the first and second update messages.

26. The call control system of claim 22 wherein the processing system processes the first and second update messages to update a routing table in an order according to the first and second priorities determined for the first and second update messages.

27. The call control system of claim 26 wherein the routing table comprises a telephony routing over internet protocol (TRIP) routing table.

28. The call control system of claim 21 wherein the first network node comprises a wireless base station.

29. The call control system of claim 21 wherein the gateway comprises a telephony routing over internet protocol-lite (TRIP-lite) enabled gateway.

30. The call control system of claim 21 wherein the call control system comprises a telephony routing over internet protocol (TRIP) enabled location server.

31. A software product for operating a call control system, the software product comprising:
software operational when executed by a processor to direct the processor to process a first update message received from a gateway coupled to a plurality of network nodes and configured to interwork communications between the plurality of network nodes wherein the first update message indicates the gateway, a first status change associated with a first network node of the plurality of network nodes, and the first network node, and process the first update message to determine an identity of a first user associated with the first network node and to determine a first priority for the first update message based on the identity of the first user associated with the first network node; and
a storage medium configured to store the software.

* * * * *